US007991654B1

(12) United States Patent
Sacks et al.

(10) Patent No.: US 7,991,654 B1
(45) Date of Patent: Aug. 2, 2011

(54) SYSTEM FOR OBJECT SELECTION, OBJECT PICKING BY LINE, OBJECT LOADING AND OBJECT DELIVERY USING AN OBJECT LOCATION IDENTIFICATION TRIGGER

(75) Inventors: Jerry Dennis Sacks, Houston, TX (US); James Michael Parks, Houston, TX (US); Gregory Parker Braun, Houston, TX (US); Christopher Burks Parr, Houston, TX (US)

(73) Assignee: Systems Application Engineering, Inc., Houston, TX (US)

( * ) Notice: Subject to any disclaimer, the term of this patent is extended or adjusted under 35 U.S.C. 154(b) by 0 days.

(21) Appl. No.: 12/772,493

(22) Filed: May 3, 2010

(51) Int. Cl.
G06Q 10/00 (2006.01)
G06K 7/10 (2006.01)
G06K 9/22 (2006.01)
G06F 3/02 (2006.01)

(52) U.S. Cl. .............. 705/28; 235/462.45; 235/462.48; 235/472.01; 345/172

(58) Field of Classification Search ................... 705/28; 235/462.45, 462.48, 472.01; 345/172
See application file for complete search history.

(56) References Cited

U.S. PATENT DOCUMENTS

| 5,450,596 | A * | 9/1995 | Felsenstein | 708/141 |
| 5,496,992 | A * | 3/1996 | Madan et al. | 235/472.02 |
| 6,026,378 | A * | 2/2000 | Onozaki | 705/28 |
| 2002/0173299 | A1* | 11/2002 | Buchholz et al. | 455/418 |
| 2003/0020629 | A1* | 1/2003 | Swartz et al. | 340/825.25 |
| 2004/0128133 | A1* | 7/2004 | Sacks et al. | 704/270 |
| 2004/0128134 | A1* | 7/2004 | Sacks et al. | 704/270 |
| 2004/0133303 | A1* | 7/2004 | Sacks et al. | 700/213 |
| 2004/0138781 | A1* | 7/2004 | Sacks et al. | 700/245 |
| 2004/0181467 | A1* | 9/2004 | Raiyani et al. | 705/28 |
| 2005/0284934 | A1* | 12/2005 | Ernesti et al. | 235/385 |
| 2006/0208086 | A1* | 9/2006 | Rudeen et al. | 235/472.01 |
| 2007/0040808 | A1* | 2/2007 | Choo | 345/172 |
| 2007/0080930 | A1* | 4/2007 | Logan et al. | 345/156 |
| 2007/0083443 | A1* | 4/2007 | Sacks et al. | 705/28 |
| 2008/0097724 | A1* | 4/2008 | Morris et al. | 702/187 |
| 2010/0271187 | A1* | 10/2010 | Uysal et al. | 340/10.4 |

OTHER PUBLICATIONS

"Staying on track with prescription drug distribution: the stakes are high in pharmaceutical distribution. Here's how the leaders are delivering meticulous quality control in order fulfillment. (Prescription Drug Distribution)", Modern Materials Handling, v57, n4, Apr. 2002.*

(Continued)

*Primary Examiner* — John W Hayes
*Assistant Examiner* — Kevin Flynn
(74) *Attorney, Agent, or Firm* — Buskop Law Group, PC; Wendy Buskop

(57) ABSTRACT

A system for selecting, picking by line, loading and delivering objects using a server with processor and data storage, at least one mobile processor, with a mobile data storage, a display, an input device and an output device, and an object location identification trigger for providing one of three signals to the host server is provided herein. The mobile processor receives, verifies, and stores various codes on objects and locations and delivery information for continuous and instantaneous use by an operator, while the operator provides the signals from the OLI trigger. The server stores various libraries containing information on an object, a location, an operator, a transport device, and a transport vehicle. The server can transmit a list of objects, a list of delivery devices, a delivery vehicle and a delivery location to the mobile processor for continuous use with the OLI trigger.

23 Claims, 13 Drawing Sheets

OTHER PUBLICATIONS

Ross et al., "A Framework for Developing Implementation Strategies for a Radio Frequency Identification (RFID) System in a Distribution Center Environment", Journal of Business Logistics, v30n1, 2009.*

Napolitano, Maida, "Voices in the warehouse: Should you listen?", Logistics Management, v46n7, Jul. 2007.*

* cited by examiner

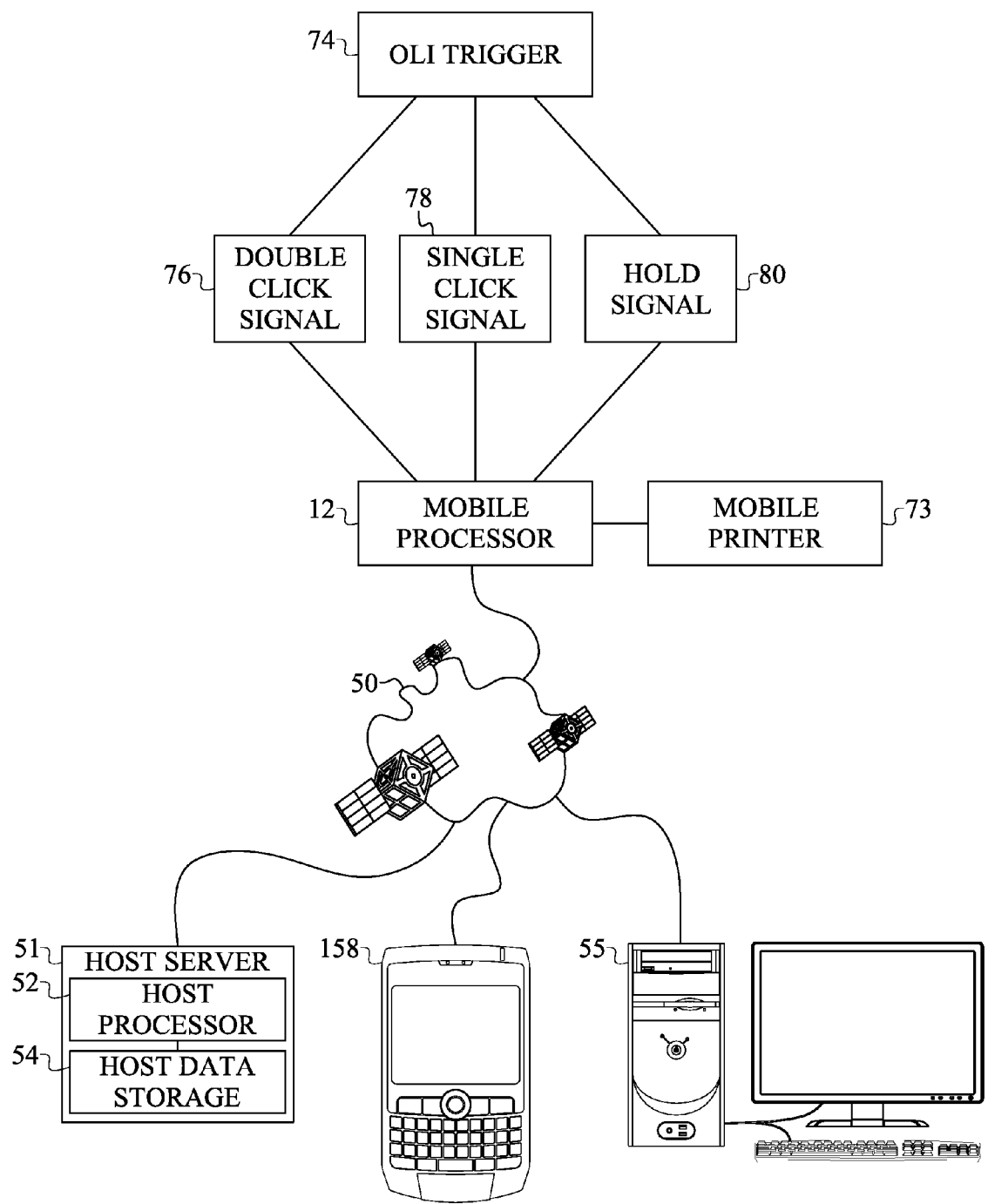

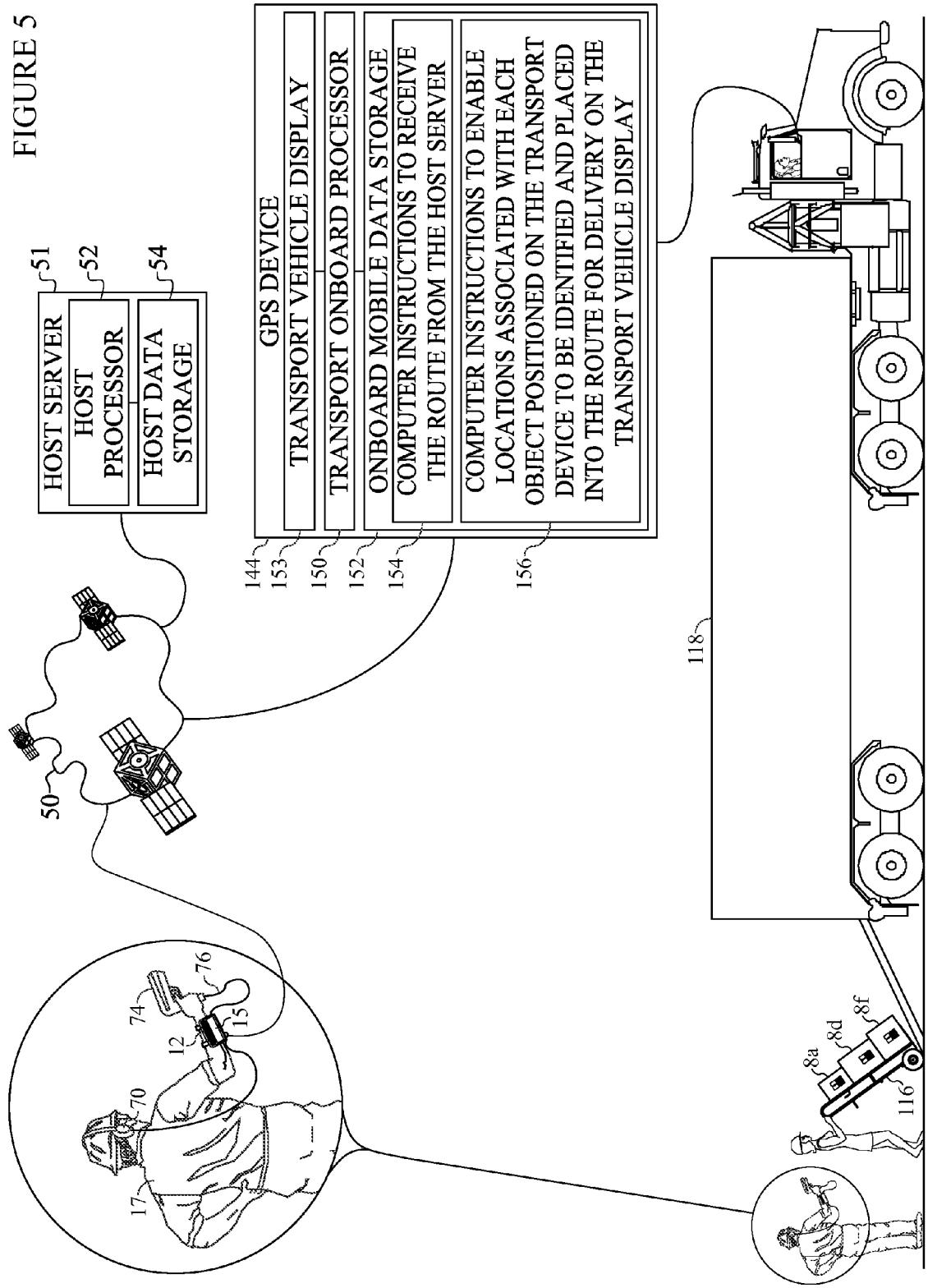

SYSTEM FOR OBJECT SELECTION, OBJECT PICKING BY LINE, OBJECT LOADING AND OBJECT DELIVERY USING AN OBJECT LOCATION IDENTIFICATION TRIGGER

FIELD

The present embodiments generally relate to a system for object location, object identification, object picking, object picking by line, object loading onto one or more transport devices, object delivery using one or more transport vehicles using at least one mobile computer having an object location identification trigger, wherein the mobile computer communicates to a host server with a host processor and a host data storage with multiple libraries via at least one network.

BACKGROUND

A need exists for a system for selecting, picking by line, also often referred to in logistics operations as picking on receipt, and loading and delivering objects using a host server with a host processor and a data storage, a mobile processor with a mobile data storage, a display, an input device, an output device, and a fast acknowledgement device.

A need exists for a system that can use a hand held fast reacting device to acknowledge an object location, an object, a transport device, a transport vehicle or a delivery location, wherein the system is quicker than using a keyboard and faster than speaking.

A need exists for a device that can provide a few simple signals to a mobile processor that connects to a host server for tracking object identification, object selection, object picking, object loading and delivery of objects.

A need exists for a system that supports the capture of data contained in a GSI DataBar in order to improve the tracking, traceability, i.e. lot number and country of origin, as well as product sell-by and expiration dates during the object selection, object picking, object loading and object delivery processes.

A need exists for a system that can assist logistics companies with data collection for complying with the Foodservice GSI US Standards Initiative that is focused on reducing wastes in the supply chain, improvement of information for customers and establishing a foundation for improving food safety.

A need exists for a system that can continuously and quickly receive, verify, and store various codes on objects and locations and delivery information for continuous and instantaneous use by an operator while the operator simultaneously provides simple signals from a simple hand held device that can be battery operated.

A need exists for a system with a portable component that communicates with a host server that stores various libraries containing volumes of information on specific objects such as weights, sizes, colors; specific locations such as shelf height, or locations in a warehouse based on aisles; specific operators such as named individuals that can repeatedly handle grocery items versus household items; specific transport devices such as cart numbers, or skids numbers, and transport vehicles, such as the large brown truck with the Kroger™ sign on it.

A need exists for a system where a host server can transmit a list of objects, a list of delivery devices, a list of delivery vehicles, and a list of delivery locations to one or two different mobile processors for an operator with a first processor to continuously pick, or pick by line, load using an Object Location Identification trigger. A second processor can be in communication with the first processor and a host server to deliver objects safely, while maintaining efficiency and speed.

The present embodiments meet these needs.

BRIEF DESCRIPTION OF THE DRAWINGS

The detailed description will be better understood in conjunction with the accompanying drawings as follows:

FIG. 4 shows an embodiment of an Object Location Identification Trigger sending signals.
FIG. 5 shows an embodiment of loading and delivery components of the system.

Figure 1:
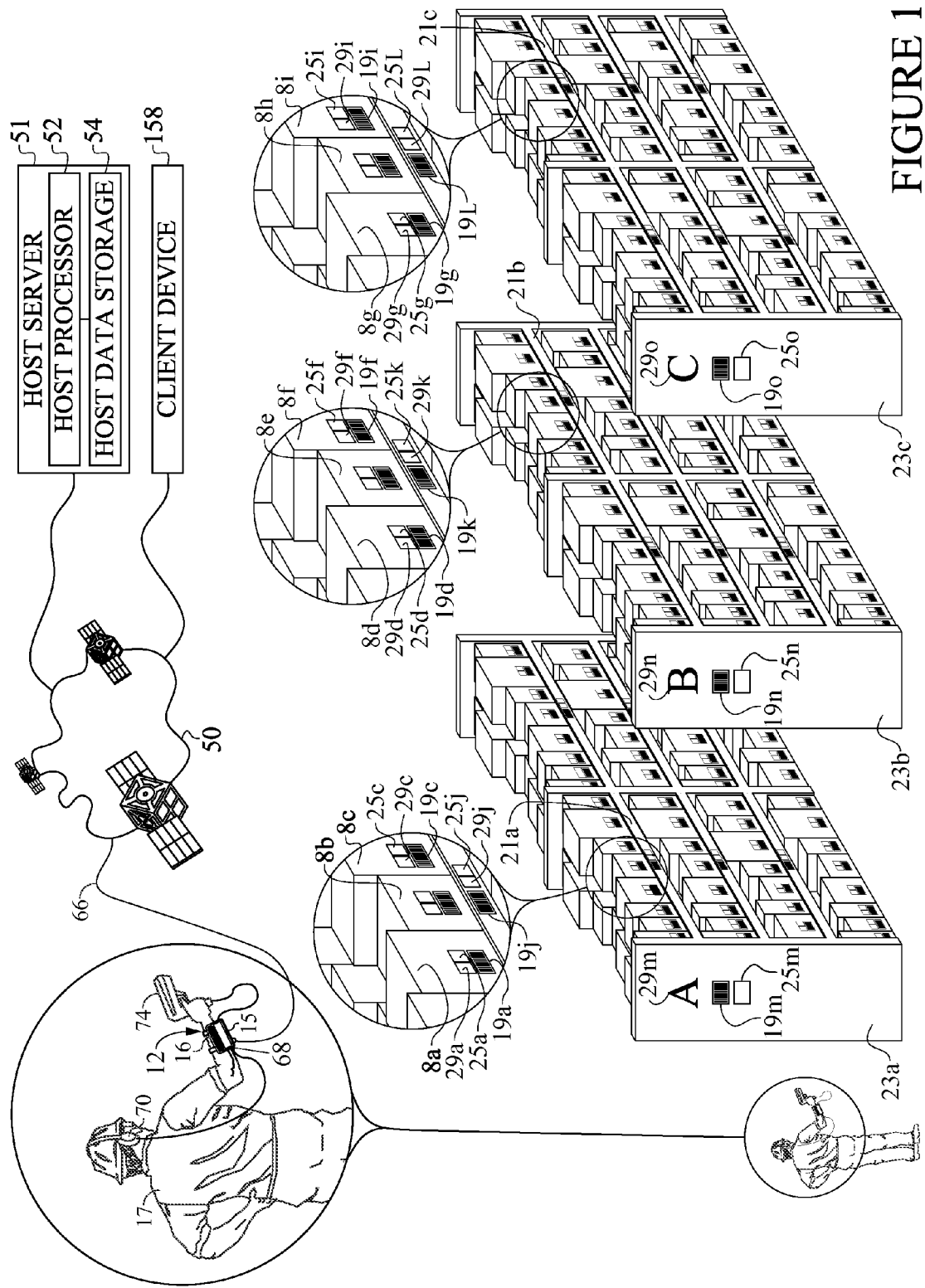
FIG. 1 shows an embodiment of the system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for selecting objects at one or more locations, picking by line objects into or on to transport devices, loading objects onto one or more transport devices and delivering objects to one or more locations by using one or more transport vehicles which uses a mobile computer and an object location identification trigger that communicates via a network to a host server. The host server can communicate with an order taking external computer using a first network. The host server can communicate via a second network or the first network to the mobile processor that can be used to scan one or more transport vehicles and transport devices, while simultaneously communicating with an onboard mobile computer for tracking deliveries.

The novel system can be used for selecting, picking by line, loading and delivering objects, such as canned food, beach chairs, or valves, by using a mobile processor with mobile data storage that communicates via a network to a host server with host processor and data storage.

The mobile processor with a mobile data storage further communicates to an operator by using a display and two input devices simultaneously. One of the two input devices can be an "Object Location Identification" trigger and can be very fast. The second input device can be a touch screen, keyboard, or joy stick. The mobile processor can simultaneously communicate with at least two output devices, one of which can be an audio output device and another can be a visual display.

The "Object Location Identification" trigger is also referred to as an "OLI trigger" herein. The OLI trigger can be a finger mounted clicker with a scanner that is wired to the mobile computer or the OLI trigger can be a finger mounted clicker with a scanner that is in wireless communication with a mobile computer.

The OLI trigger can be used with each mobile processor, namely, the onboard processor of the transport vehicle and the mobile computer of an operator for picking objects and loading objects. The OLI trigger can be adapted to provide a plurality of signals, such as three simple signals, to the mobile computer. The three simple signals can be a single click, a double click and a hold signal.

The simplicity of this process, the low cost of the operation, and the technique to increase the quantity of object or items that can be selected, picked by line, loaded or delivered can provide productivity increases from 5% to 25% for customers that pick, load and delivery up to 6,000,000 objects or items per day.

This simple invention can save fuel costs because it can increase efficiency.

This simple invention can save labor costs, such as costs associated with picking objects, loading objects, and delivering objects.

This simple invention can enable the operator to pick objects accurately and faster than by using spoken word or keystrokes on a keyboard.

The mobile processor can be used to receive, verify, and store various codes on objects and can store locations, such as a certain shelf. The mobile processor can be continuously and instantaneously used in a warehouse by the operator, whereby the operator can use the OLI trigger with a single click, a double click and a hold signal.

The mobile processor can be used to receive, verify, and store codes for loading the objects on a particular numbered pallet and for delivering objects by delivery location.

The codes can indicate which transport device or transport vehicle is to be used for loading or for delivery.

The system can provide codes in a continuous and instantaneous manner to the operator, while the operator can provide a single click, a double click or a hold signal from the OLI trigger to the mobile computer. Thus, the host server can be continuously used, as opposed to a batch system.

An external computer can take, order, and create a list, or can create a delivery route for a customer.

The external computer, via a network, can download the route to the host server.

The host server can provide a mobile computer with the list for picking the specific transport device necessary to load the items.

Once the objects are picked and loaded on the correct transport devices, all object and transport information, including all information on which items are picking short and what the specific catch weights are for certain items, are communicated to an onboard mobile computer on a delivery vehicle. The host computer transfers the route map to the onboard computer data storage for displaying addresses for delivery to the driver.

In an embodiment, a host server with a host processor and a host data storage can store and continuously update various libraries in its data storage. The data storage can contain information on objects to be selected, identification of transport devices for loading, picking by line, and delivery to various locations. The updated information can include information on transport vehicles, updated street addresses, and names of customer locations for delivery of the objects (with or without an additional transport device).

The mobile computer can have a data storage to maintain a library of information on all operators of the system, such as operator names, operator log ins and operator passwords.

The mobile computer can have computer instructions in its data storage to verify that an operator has been transmitted the correct information about objects to be selected, picked by line, loaded, and delivered or any combinations of these steps, depending on the situation.

The mobile computer can have computer instructions in the host data storage that compiles and transmits lists of objects, lists of delivery devices, lists of delivery vehicles, and lists of delivery locations to one or both of the mobile processors use, while the operator pulls the OLI trigger to continue to pick, load and deliver.

The mobile processor can be wearable by an operator, which the operator selects objects, picks by line objects, loads objects, and moves loaded transport devices with objects onto transport vehicles or near transport vehicle. The mobile processor can be in communication with the host server through at least one network, such as a wireless network, a cellular network, a Bluetooth communications network, or another network.

The mobile processor with OLI trigger may communicate on a separate network with the host server and an onboard computer. The onboard computer can have an onboard computer processor with an onboard data storage.

The mobile processor can be in communication with its own mobile data storage, a display, and a first output that can connect to an output device, such as headphones to be worn by an operator. The mobile processor can be in communication with a second output that can connect to the display.

The mobile processor can have at least two inputs for receiving information from the OLI trigger and from another source, such as a keyboard or touch screen. The inputs can be used simultaneously for fast operation.

The mobile processor can also be in communication with additional input devices, such as a wearable scanner, an optical reader, an RFID tag indicator reader, or a bar code reader.

In one or more embodiments, the input device can be a touch screen, a joy stick, or a Braille command input device, or combinations thereof.

The input device can be a three dimensional spatial coordinate sensor that allows the operator to communicate object information, such as alpha codes, numeric codes or combinations thereof to the mobile processor and onto the host server.

The input device can allow the operator to make multiple requests for information, such as:

Lists of objects to be selected in the warehouse, or other facility with lots of objects for loading, which could be "oil field drill bits size 12";

Lists of objects to be loaded on a specific transport device, such as "all the #2 box filters go on the cart numbered 1234";

Lists of objects to be loaded on specific transport vehicles, such as "all objects on the transport device Cart 1235 go on the brown truck 34 in bay 12."

In an embodiment, one of the input devices can be used with this system to communicate acknowledgement of a list through a physical motion of the operator with the input device, such as the sweep of the arm.

The physical motion of the input device can also be used to initiate a communication from the input device to the mobile processor.

The mobile data storage can have computer instructions to receive, verify, and store various codes on objects. For example, canned corn can have a code on it for a 12 pack and a different code on it for a 24 pack.

The codes on objects can include: a bar code, an RFID (Radio frequency identification) tag, an alpha code, a numeric code, an alpha-numeric code, or combinations thereof.

The mobile data storage can have computer instructions to receive, verify, and store various bar codes to identify a first location proximate to one or more of the objects. The first location can be a location such as Shelf 2 of Aisle 10 in the Green warehouse.

The first location can have a bar code, an RFID (Radio frequency identification) tag, an alpha code, a numeric code, an alpha-numeric codes, or combinations thereof.

The mobile data storage can have computer instructions to receive, verify, and store codes related to a second location that can be proximate to the first location, such as an aisle location proximate to a shelf location. The second location can be the end of Aisle 10, wherein the 12 pack of canned corn is located on shelf 2.

The second location proximate to the first location can have a bar code, an RFID (radio frequency identification) tag, an alpha code, a numeric code, an alpha-numeric code, or combinations thereof.

The mobile data storage can include computer instructions to receive, verify, and store codes on at least one transport device, such as a cart (numbered 456) or a pallet with an RFID tag.

The transport device can be a bar code, an RFID (Radio frequency identification) tag, an alpha code, a numeric code, an alpha-numeric code, or combinations thereof.

The mobile data storage can include computer instructions to receive, verify, and store codes on a location of a transport vehicle, such as BAY 12.

The location of the transport vehicle can be can be a bar code, an RFID (radio frequency identification) tag, an alpha code, a numeric code, an alpha-numeric code, or combinations thereof.

The mobile data storage can include computer instructions to receive, verify, and store codes on a transport vehicle, such as Truck 24.

The transport vehicle can be can be a bar code, an RFID (radio frequency identification) tag, an alpha code, a numeric code, an alpha-numeric code, or combinations thereof.

An operator can drive the transport vehicle, while an onboard mobile processor with transport vehicle display, two different transport vehicle input devices, and at least two transport vehicle outputs with at least one transport vehicle output device can be used.

The onboard mobile processor can communicate with an onboard mobile data storage to receive a list of objects to be delivered from the host server.

The onboard mobile processor can use an OLI trigger, while on the transport vehicle, to acknowledge the continuous feed of information. In this way, the operator can be continuously redirected and rerouted when necessary or due to changed conditions.

A driver may have to change a delivery schedule while driving based on a new customer need, such as a delivery of meat for a wedding dinner with a delivery time scheduled for 4 pm that must now occur at 12 noon.

Changes in a route may be needed, due to changed road conditions or for efficiency, so the driver may need to be rerouted from one interstate to another interstate. The transport vehicle mobile computer data storage and onboard processor can communicate with the host server, and with a built in or on-board global positioning device (GPS) to enable the host server to track the exact location of each truck and re-route. This allows a driver to acknowledge a change with a trigger, rather than having to stop the truck and type in a change.

Text messaging is no longer necessary, which is really important to drivers as the text messaging laws have changed. This invention allows an operator to provide acknowledgement to changes while driving without sending a text message.

The mobile data storage of either processor can include computer instructions to provide a first command to an operator identifying one or more objects to select, one or more first locations to visit for the objects, identifying one or more second locations proximate to the first locations, identifying one or more transport devices for loading one or more objects, identifying one or more locations of the transport vehicles, or identifying one or more vehicles to load transport devices or objects onto.

For example, a first command could be text viewable on the display that reads:

12 canned corn 24 packs number A34

Another example of the first command can read:

"Aisle 12"

Another command could be:

Load 3 canned corn 24 packs on cart 3
Load 2 canned corn 24 packs on cart 1
Load 7 canned corn 24 packs on pallet AB;

Another command could be:

Take all objects on transport device to loading bay 6

Another command could be

Load transport device 3 and transport device 6 on truck 3 in loading bay 6.

Another command could be

Load transport device 3 on truck 3 in loading bay 6
Leaving transport device 1 at loading bay 2.

The above are just a few examples of the commands that can be used in this system.

Alternatively, the commands can be expressed as numbers

For example, the screen may display:

BC-119-11 BC-120-00

1 B-2 2 A-3

The first indicator "BC" can be an aisle number.

The "119-11" can be a slot number for the goods.

The "1" under the "BC" can be a quantity of goods.

The "B-2" can be a pallet number B in quadrant 2 of the pallet.

Additional information can be expressed on the screen, such as the type of goods, "margarine solids pure vegetable"

An order number 23456 can be on the screen.

The route 901 can be on the screen, as well as the customer name.

The mobile data storage can include computer instructions to provide a second command to the operator indicating the operator should now move to the second location from the first location. This command can be repeated as needed by the warehouse or operator.

An example of this command would be:

Command 1—Go to aisle 3 with cart 3
Command 2—Go to shelf 2 pick 6 green pea 3 packs
Command 3—Go to aisle 1 with cart 3
Command 4—pick 4 60 can units of SPAM
Command 5—leave loaded cart 3 at Bay 10 for truck 2

The command can be presented visually on the display, such as words, a flashing indicator, or anther visual command.

The commands can be presented as an audio command, such as a verbal text message transmitted through an audio output, or as a sequence of beeps (such as 3 beeps means aisle 3), or another audio command. For example, beeps can acknowledge that the scanning occurred properly (1 beep) or improperly (3 beeps).

The mobile data storage can include text-to-speech computer instructions to enable the mobile processor to translate a text command to audio commands for the operator. This feature enables the commands to be presented simultaneously as both text and audio, to reduce mistakes, and quicken the picking of the objects, thereby reducing expensive delays in the picking process.

For example, a command provided by the mobile data storage on the display instructing the operator to "Go to Aisle 12, Shelf 4 to select Box 1" can be translated by the mobile processor into an audio command in Spanish and simultaneously provided to the audio output of the operator. This increases the versatility of the system.

This system can ensure good communication for people who can't read. They can still do a good job and be an employable, happy worker, who is productively engaged.

The mobile data storage can include computer instructions for receiving queries from the operator. For example, the operator can ask the mobile processors to repeat the last audio command by using the input device or the OLI trigger. This is very fast.

The computer instructions in the mobile data storage can enable the mobile processors to receive queries from the operator, to respond to the query, and to pass the query onto the host computer via the network if more information is needed.

Both of the mobile data storages can include computer instructions to request the host server to verify that the mobile data storage has a current version of at least one library needed to do the picking, the loading and/or the delivery of the objects.

The mobile data storage and the transport vehicle mobile data storage can include computer instructions for receiving updated versions of the libraries from the host server, such as by downloading the updated versions of the libraries. The system can ensure that the libraries in the mobile data storage are up-to-date at all times.

The libraries can be loaded in the mobile data storages of this system from the host server. The libraries can include a library of identifiable objects to be selected; a library of each first location associated with each object to be selected; a library of each second location associated with each first location; a library of authorized operators of the mobile computers, a library of operator information on the operators; a library of objects to be loaded; a library of transport devices; a library of transport vehicles; a library with mapping software, a library of customers for delivery, or combinations thereof.

Each library can include a listing of all associated elements within that library and information related to the associated elements. For example, in the library of transport devices, the library can include a listing of all transport devices, carts, mini-trucks, skids, pallets and so on.

The library of transport devices can also include information related to each transport devices, such as each bar code, each RFID tag, each alpha code, or each numeric code disposed on each transport device.

The library may also include information on how much weight the transport device can carry, when the device was last serviced or last inspected for safety, and who used the transport device last.

Other specification information on the transport device can be included in the library, such as volume capacity of the transport device, how long the battery lasts, how many wheels the transport device has, and other detailed specification information.

The host data storage can include computer instructions to receive requests from the mobile processor for a list of objects to be selected, for a list of objects to be loaded, for a list of transport devices to be loaded, a list of transport vehicles to be loaded and a list of delivery locations.

The host data storage can include computer instructions to compile the various lists using the libraries in the host data storage and using a customized "task list" for picking, pick-by-line, loading and delivery based on customer orders.

Furthermore, the host data storage includes computer instructions to transmit the list of objects to be selected, the list of objects to be loaded, the list of transport devices to be loaded, the list of transport vehicles to be loaded and the list of delivery locations from the host data storage to the mobile data storage or the onboard mobile data storage.

The mobile data storage and the onboard mobile data storage can include computer instructions for providing results from use of the OLI trigger, the input device or both to the host server via the network.

The OLI trigger can connect to an input on the mobile processor and another input device, like a back up keyboard that can be used to connect to a second input on the mobile processor.

A second output can connect the display with the mobile processor for viewing by the operator with the mobile computer.

The audio output device and the display can provide commands to the operator, such as "go to 123 Main Street, Houston, Tex.".

The display, the audio output device, or both can present one or more of the aforementioned lists to the operator as well as the commands.

The OLI trigger can be integral with the mobile processor formed in the housing, or it can be a separate device that connects to the mobile processor, either wirelessly or with a cable.

The OLI trigger has a trigger type button that the operator can click, double click, or hold to create a signal that transfers to the mobile processor, which can then be uploaded to the host server.

The OLI trigger can be any one of the following: a wearable scanner with a button, an optical reader with a button, an RFID reader with a button allowing double clicks, single clicks or holds, or a bar code reader with a button.

In another embodiment the OLI trigger looks like a gun, and has a trigger mechanism like a gun that can have a scanner, an optical reader, an RFID reader, or a bar code reader on the gun barrel portion.

Examples of OLI triggers are the scanner triggers or buttons on the ring scanner and back-of-the-hand scanners made by Motorola of Chicago, Ill., United States, model numbers RS409 and RS309.

The operator can use the OLI trigger to communicate to the mobile processor that the operator has completed a command, by quickly pulling the trigger as a single click, a double click or a hold.

No English or standardized language is needed with this process for high efficiency picking, picking by line, loading and delivery.

The assembly can eliminate recognition errors often associated with spoken input or spoken responses that might occur without such a trigger device.

A "double click" signal can be used to indicate an operator is ready for the next command. For example, the operator can actuate or click the OLI trigger twice to initiate the transmission of a signal to the mobile processor, thereby providing the communication that the operator is ready for the next step.

The operator can use the double click to answer "yes" to a question presented by the mobile processor, such as "Are the brakes working correctly?". The operator can double click to indicate a "yes" answer.

The operator can use the OLI trigger to send a request to the mobile processor to repeat the most recent command, question, information or statement by providing a "single click" signal.

The operator can use the OLI trigger to provide a "hold" signal that informs the mobile processor that the operator is ready to perform the following: scan or read a bar code, an RFID tag, an alpha code, a numeric code, or combinations thereof on at least one of the objects, at a first location, at a second location, at a transport device, at a location proximate to a transport vehicle, or on a transport vehicle.

One or more embodiments of the system can include communicating from the host server, the mobile processor, the onboard mobile processor, or combinations thereof, to an external computer system or to a client device. The external computer system or client device can be a client laptop that uses the network.

The external computer can have a data storage to take orders from customers, store orders, track inventory and create bills for customers. The external computer is can be connected via the Internet to the host server.

The object information, requests, or other communications transmitted by using an input device can include using an input device that recognizes a dimension of the object, such as a three dimensional spatial coordinates.

Another embodiment can include using an input device to recognize a physical movement, such as waiving an arm as a yes answer or a no answer. The input device can recognize a request to repeat a command, an indication that a task commanded is now complete, or an indication that the operator: "cannot find the object", "cannot find the first location", "cannot find the second location", "cannot find the transport device", "cannot find the transport vehicle", "cannot find the location near the transport vehicle", "cannot find the delivery location", or combinations thereof.

In one or more embodiments, the mobile data storage can include computer instructions to transmit an operator code such as a log in number entered by the operator into the mobile processor to the host processor.

The system can have the ability to verify each operator. This can prevent unwanted access to the system by individuals who are not trained on how to use the system.

The host data storage can include computer instructions to acknowledge the operator code and to verify that the operator associated with the operator code can have access to the mobile processor and the libraries.

The mobile data storage can include computer instructions for instructing the mobile processor to prepare a summary of objects to be selected. The summary of objects to be selected can be categorized according to the first location and second location of each object, transport device, transport vehicle, and delivery location.

The summary of objects can include an indication of a quantity of each object to be selected at each location. The summary of objects can be prepared using the lists of objects and the libraries.

The mobile data storage can include computer instructions to obtain, store, and display status information on a successful completion of the tasks relative to the objects on the lists.

These computer instructions can be used to continuously and instantaneously provide an indication of the operator's performance compared to an expected completion time. The expected completion time can be an expected completion time for completing selection of the objects on the list of objects to be selected or completing another one of the many tasks on one or more of the lists.

The mobile data storage can include computer instructions for receiving information from the input device or the OLI trigger that the operator has "picked short". The mobile data storage can then transmit a command to the audio output device, display, or combinations thereof for the operator to receive for action.

An example of when the operator has "picked short" can include a circumstance where the operator has provided an indication or communication to the mobile processor by using the input device that a quantity of selected objects by the operator is less than a quantity of objects indicated on the list of objects to be selected.

The mobile data storage can include computer instructions to allow the operator to use the input device to enter and store a reason the operator has "picked short", a reason the quantity of selected objects is less than the quantity of objects indicated on the list of objects to be selected, or combinations thereof.

The mobile data storage can include computer instructions to allow the operator use the input device to enter and store a reason the operator "picked short", a reason the quantity of selected objects is less than the quantity of objects indicated on the list of objects to be selected, or combinations thereof.

The mobile data storage can include computer instructions for providing an alert to the operator that one of the objects on the list of objects to be selected is a "catch weight item".

The alert can be an audio or visual alert that can be communicated to the operator by using the display and/or the audio output. The alert can be provided by using the text-to-speech computer instructions, wherein the audio is in one language and the text is in a different language.

The term "catch weight item" is defined herein to mean the total number of pounds on cases that change weight, such as 5 turkeys weighing 50.1 pounds can be a "catch weight" for the turkeys.

The mobile data storage can include computer instructions for recording the number and weight of catch weight items. The operator can use the input device to record the number and weight of catch weight items.

The mobile data storage can include computer instructions to provide a "high quantity item" alert to the operator by using the output device after the summary of objects to be selected is provided to the operator.

The "high quantity item" alert can be an audio or visual alert that can be provided using the audio output or the display, and can be provided when a large quantity of a particular item is required to be selected, loaded, or delivered.

An example of the use of a high quantity alert would be where the quantity of items or objects to be selected is large enough so that it is easier to pull a full pallet or case, and then unload or take off a few of the items or objects until the quantity of items or objects equals the quantity to be picked rather than creating a new pallet by picking or transferring a high quantity of the objects or items to the new pallet. This saves time and work.

One or more embodiments of the system can include using at least one transport device. Each object to be selected can be disposed on or contained by a transport device. A transport device can include a cooler, a pallet, a tote, a box, a sack, a bag, a wheeled trolley, a container, or combinations thereof.

One or more embodiments can include using a transport vehicle to carry the transport devices, such as from a warehouse to a delivery location. These transport devices may have an on-board GPS that communicates directly to the host server or to the onboard mobile processor.

The mobile data storage can include computer instructions to instruct the mobile processor to provide a request to the operator to answer a series of safety questions regarding any transport device or transport vehicle to be used for loading or delivery.

The request to answer safety questions can be provided to the operator by using the display or the audio output or simultaneously using both.

The safety questions can include: "Are brakes on the transport vehicle working?"; "Is a horn on the transport vehicle working?"; "Is steering on the transport vehicle working?"; "Is the transport vehicle free of damage?"; "Is the transport vehicle free of leaks?"; "Are tires on the transport vehicle inflated and undamaged?"; and "Are forks on the transport vehicle undamaged?".

The mobile data storage can include computer instructions for instructing the mobile processor to alert the operator to position each object at a specific location on an identified transport device or transport vehicle. The alert can be provided to the operator using the display or the audio output. For example, the specific location on the transport device can be at a bottom of a left quadrant of a pallet. For example, the specific location on the transport vehicle can be at a rear left portion of trailer of truck 12 in Bay 11.

Turning now to the host data storage, the host data storage can include computer instructions to indicate to the mobile processor at least one location for delivery of objects selected from the list of objects to be selected. The at least one location for delivery can be a loading location, a staging location, an interim location, a back of a truck, a trailer, or a vessel.

The host data storage can include computer instructions to create a route associated with each object disposed on a transport vehicle. The route can be created using GPS or other mapping software that can be stored in the host data storage. The host server can transmit the route to the mobile processor, the transport onboard processor, the mobile data storage, or the onboard mobile data storage through the network.

The onboard mobile data storage can include computer instructions to receive the route from the host server.

One or more embodiments can include a client device, such as a laptop, a portable digital assistant (PDA), a smart phone, a cellular phone, or another device. The client device can be in communication with the mobile processor, the host processor, the transport onboard processor, or combinations thereof through the network.

Turning now to the figures, FIG. 1 shows a system for selecting objects 8a-8i.

A bar code 19a can be associated with the object 8a, a bar code 19c can be associated with the object 8c, a bar code 19d can be associated with the object 8d, a bar code 19f can be associated with the object 8f, a bar code 19g can be associated with the object 8g, and a bar code 19i can be associated with the object 8i.

An RFID tag 25a and an alpha/numeric code 29a can be associated with the object 8a, an RFID tag 25c and an alpha/numeric code 29c can be associated with the object 8c, an RFID tag 25d and an alpha/numeric code 29d can be associated with the object 8d, an RFID tag 25f and an alpha/numeric code 29f can be associated with the object 8f, an RFID tag 25g and an alpha/numeric code 29g can be associated with the object 8g, and an RFID tag 25i and an alpha/numeric code 29i can be associated with the object 8i.

A bar code 19j, an RFID tag 25j and an alpha/numeric code 29j can be associated with a first location 21a, here shown as a shelf. A bar code 19k, an RFID tag 25k and an alpha/numeric code 29k can be associated with a first location 21b. A bar code 19L, an RFID tag 25L and an alpha/numeric code 29L can be associated with a first location 21c.

A bar code 19m, an RFID tag 25m, and an alpha/numeric code 29m can be associated with a second location 23a, here shown as an aisle. A bar code 19n, an RFID tag 25n, and an alpha/numeric code 29n can be associated with the a second location 23b. A bar code 19o, an RFID tag 25o, and an alpha/numeric code 29o can be associated with the a second location 23c.

A host server 51 can have a host processor 52 and a host data storage 54. The host server 51 can be in communication with a network 50.

An operator 17 can have a mobile processor 12 which can be in communication with a display 15, an input 16, and an audio output device 70 which can be in communication with an output 68.

The operator 17 can have an OLI trigger 74 which can be in communication with the mobile processor 12.

A client device 158 can be in communication with the network 50. Status information 66 can be communicated over the network 50.

Figure 2A:
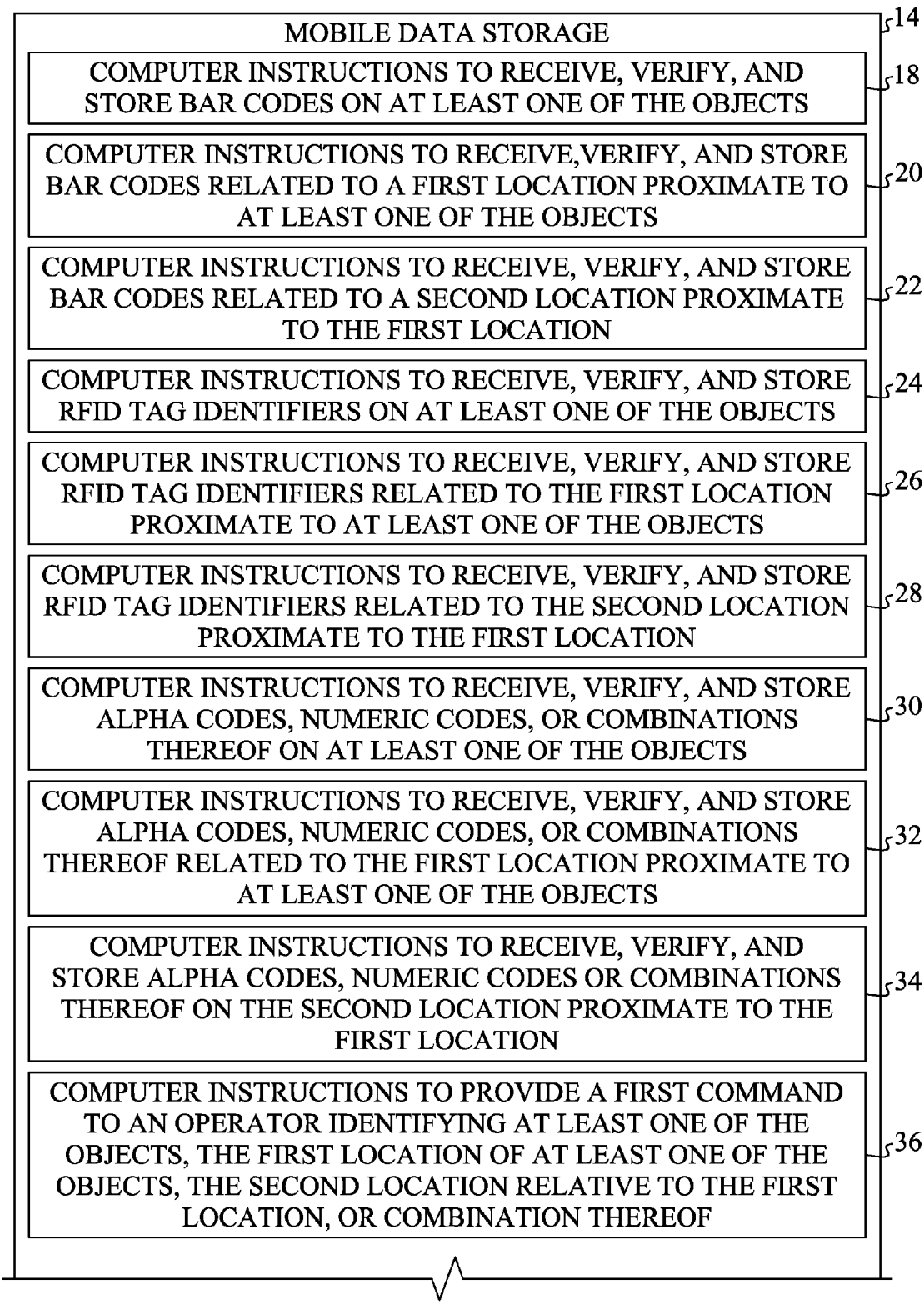
FIG. 2A shows computer instructions in the mobile data storage.

FIG. 2A depicts an embodiment of the mobile data storage 14.

The mobile data storage 14 is shown including: computer instructions 18 to receive, verify, and store bar codes on at least one of the objects; computer instructions 20 to receive, verify, and store bar codes related to a first location proximate to at least one of the objects; computer instructions 22 to receive, verify, and store bar codes related to a second location proximate to the first location; computer instructions 24 to receive, verify, and store RFID tag identifiers on at least one of the objects; and computer instructions 26 to receive, verify, and store an RFID tag related to the first location proximate to at least one of the objects.

The mobile data storage 14 is also shown including: computer instructions 28 to receive, verify, and store an RFID tag related to the second location proximate to the first location; computer instructions 30 to receive, verify, and store alpha codes, numeric codes, or combinations thereof on at least one of the objects; computer instructions 32 to receive, verify, and store alpha codes, numeric codes, or combinations thereof related to the first location proximate to at least one of the objects; computer instructions 34 to receive, verify, and store alpha codes, numeric codes or combinations thereof on the second location proximate to the first location; and computer instructions 36 to provide a first command to an operator identifying at least one of the objects, the first location of at least one of the objects, the second location relative to the first location, or combination thereof.

Figure 2B:
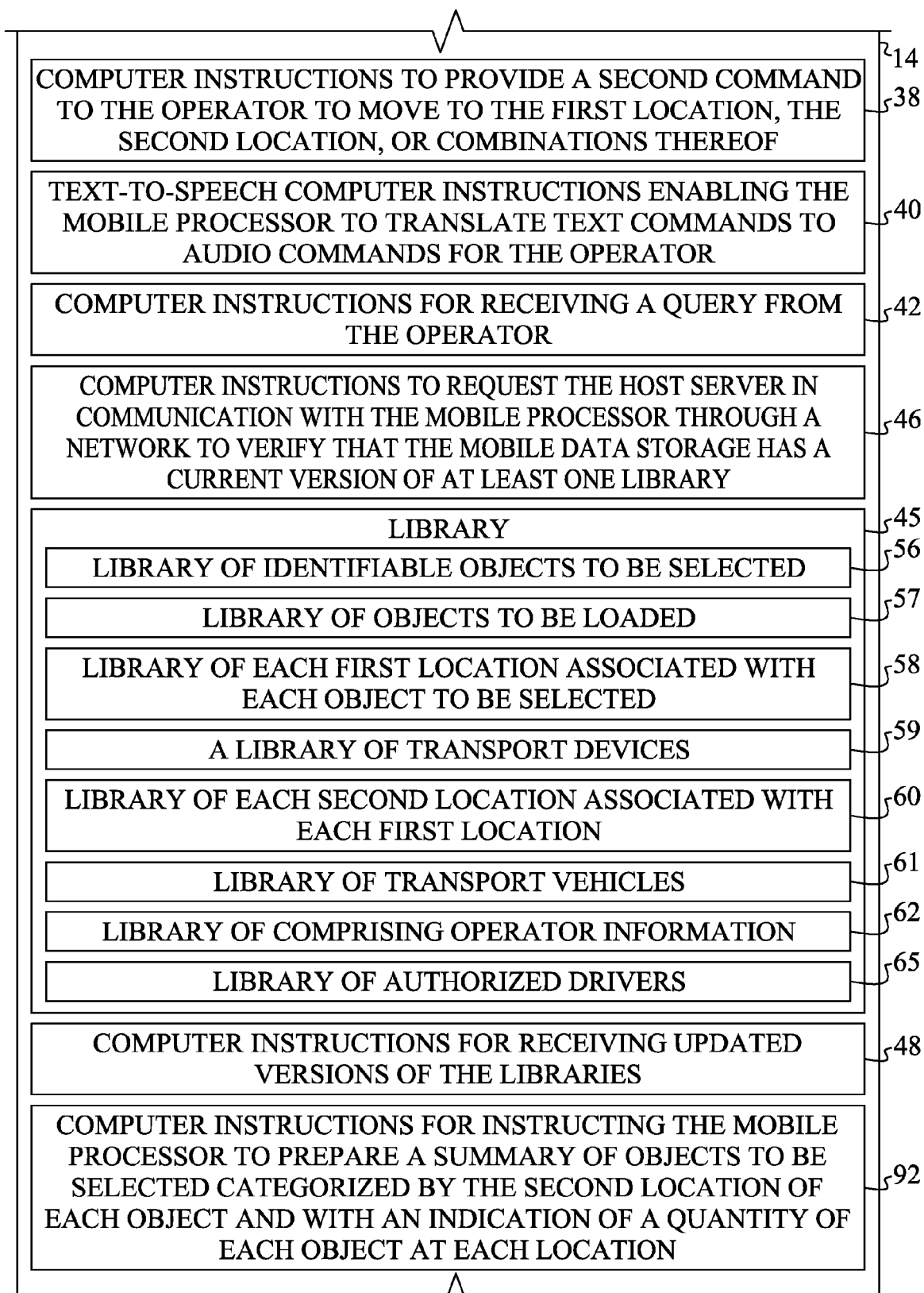
FIG. 2B is a continuation of FIG. 2A.

FIG. 2B shows a continuation of FIG. 2A.

The mobile data storage 14 can include: computer instructions 38 to provide a second command to the operator to move to the first location, the second location, or combinations thereof; text-to-speech computer instructions 40 enabling the mobile processor to translate text commands to audio commands for the operator; computer instructions 42 for receiving a query from the operator; and computer instructions 46 to request the host server in communication with the mobile processor through a network to verify that the mobile data storage has a current version of at least one library.

The mobile data storage 14 can include the libraries 45 which can include: the library of identifiable objects to be selected 56; the library of each first location associated with each object to be selected 58; the library of each second location associated with each first location 60; the library of comprising operator information 62, which can be a list of operators who are authorized to use the host data storage.

The library 45 can also include the library of objects to be loaded 57; the library of transport devices 59; the library of authorized drivers 65; and the library of transport vehicles 61.

The mobile data storage 14 can include computer instructions for receiving updated versions of the libraries 48 and computer instructions for instructing the mobile processor to prepare a summary of objects to be selected and categorized by the second location of each object and with an indication of a quantity of each object at each location 92.

Figure 2C:
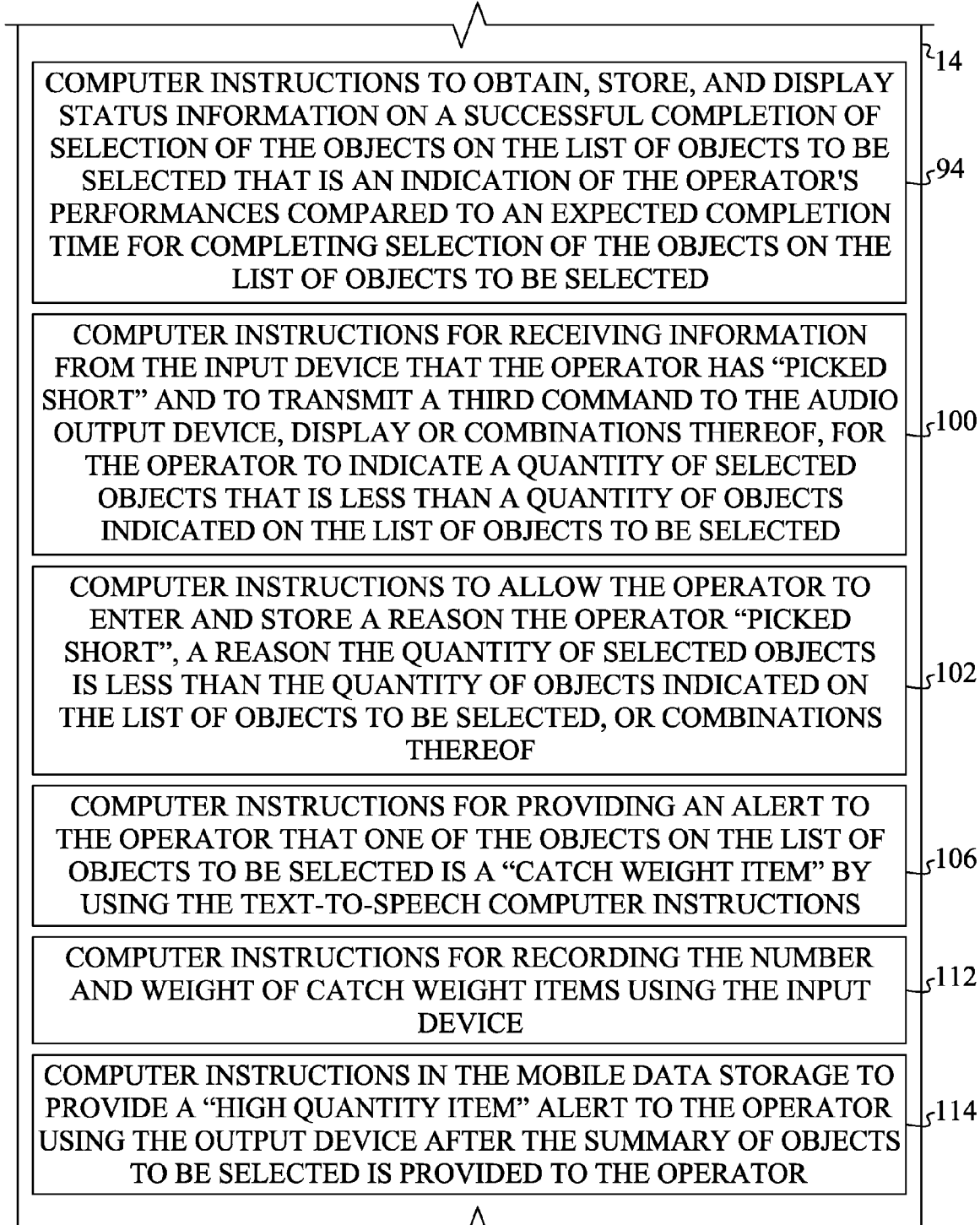
FIG. 2C is a continuation of FIG. 2B.

FIG. 2C is a continuation of FIG. 2B.

The mobile data storage 14 can include: computer instructions 94 to obtain, store, and display status information on a successful completion of selection of the objects on the list of objects to be selected that is an indication of the operator's performances compared to an expected completion time for completing selection of the objects on the list of objects to be selected and computer instructions 100 for receiving information from the input device that the operator has "picked short" and to transmit a third command to the audio output device, display or combinations thereof, for the operator to indicate a quantity of selected objects that is less than a quantity of objects indicated on the list of objects to be selected.

The mobile data storage 14 can include: computer instructions 102 to allow the operator to enter and store a reason the operator "picked short", a reason the quantity of selected objects is less than the quantity of objects indicated on the list of objects to be selected, or combinations thereof; computer instructions 106 for providing an alert to the operator that one of the objects on the list of objects to be selected is a "catch weight item" by using the text-to-speech computer instructions; computer instructions 112 for recording the number and weight of catch weight items using the input device; and computer instructions 114 to provide a "high quantity item" alert to the operator using the output device after the summary of objects to be selected is provided to the operator.

Figure 2D:
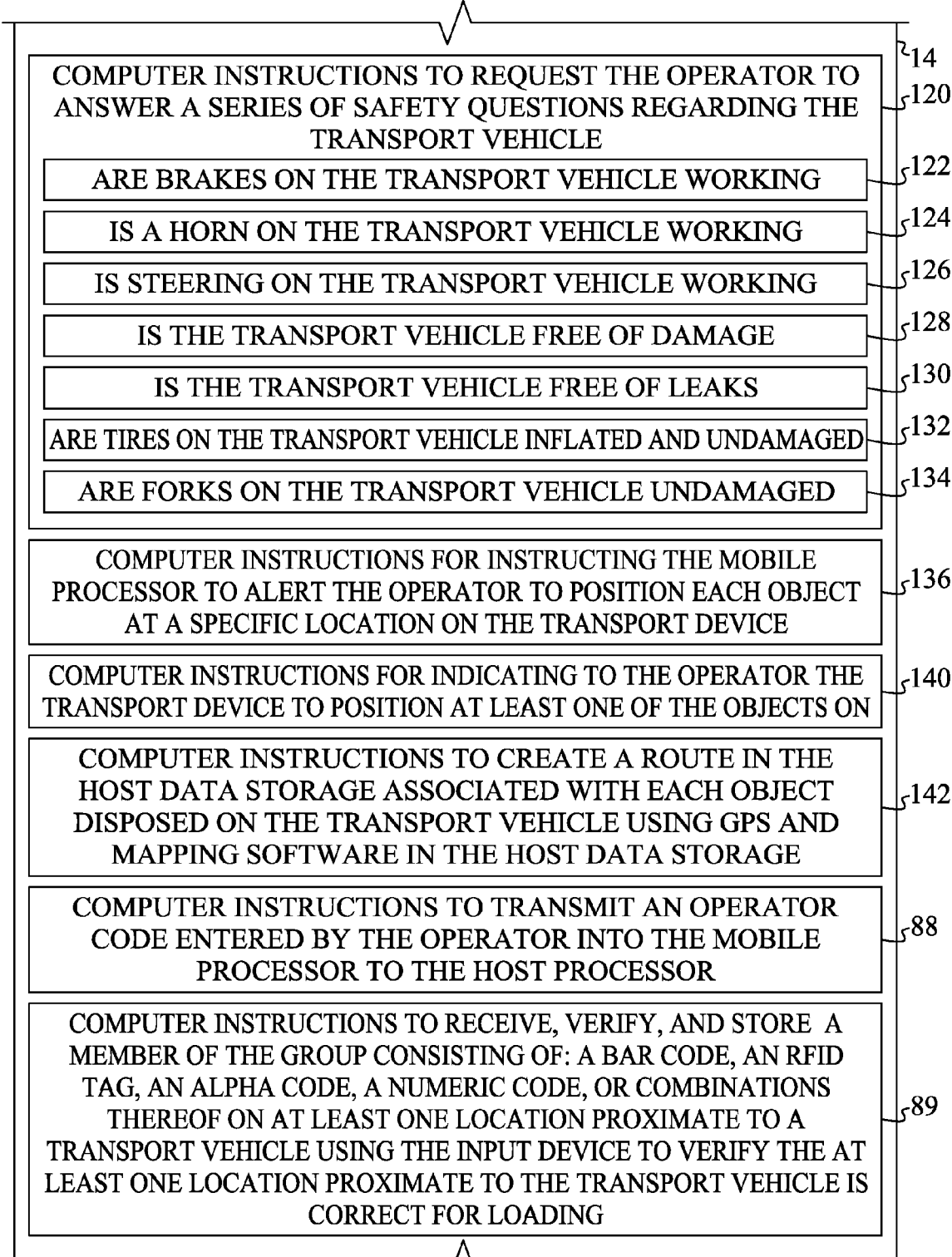
FIG. 2D is a continuation of FIG. 2C.

FIG. 2D is a continuation of FIG. 2C.

The mobile data storage 14 can include: computer instructions 120 to request the operator to answer a series of safety questions regarding the transport vehicle; computer instructions 136 for instructing the mobile processor to alert the operator to position each object at a specific location on the transport device; computer instructions 140 in the mobile data storage for indicating to the operator the transport device to position at least one of the objects on; and computer instructions 142 to create a route in the host data storage associated with each object disposed on the transport vehicle using GPS and mapping software in the host data storage.

The computer instructions 120 is shown including the following questions: are brakes on the transport vehicle working? 122; is a horn on the transport vehicle working'? 124; is steering on the transport vehicle working? 126; is the transport vehicle free of damage? 128; is the transport vehicle free of leaks? 130; are tires on the transport vehicle inflated and undamaged? 132; and are forks on the transport vehicle undamaged? 134.

Where the questions are designed to normally be answered "yes" the operator with this system can reply "yes" by clicking twice with the OLI trigger.

Also shown in the mobile data storage 14 is computer instructions 88 to transmit an operator code entered by the operator into the mobile processor to the host processor.

The mobile data storage 14 can have computer instructions 89 to receive, verify, and store a member of the group consisting of: a bar code, an RFID tag, an alpha code, a numeric code, or combinations thereof on at least one location proximate to a transport vehicle using the input device to verify the at least one location proximate to the transport vehicle is correct for loading.

Figure 2E:
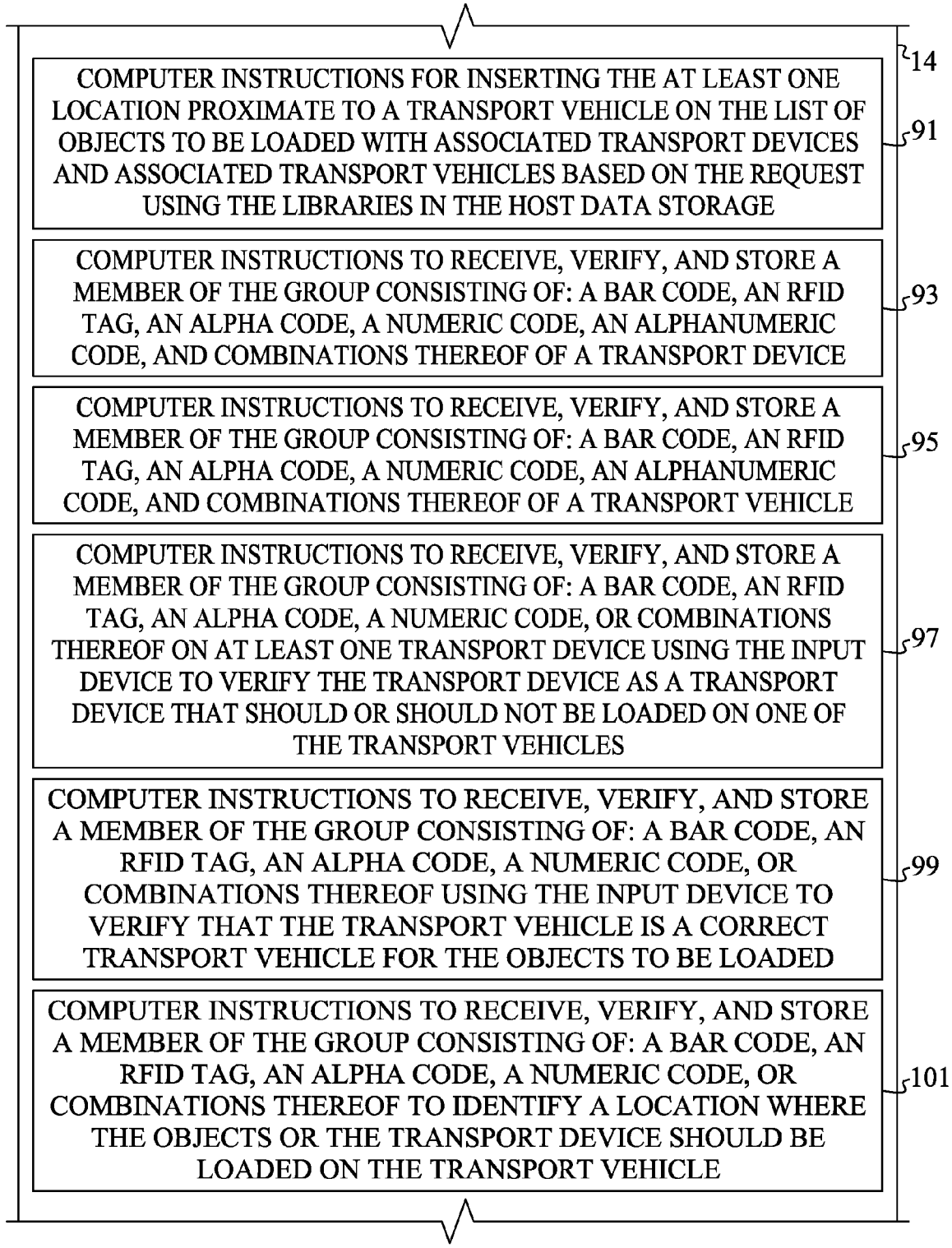
FIG. 2E is a continuation of FIG. 2D.

FIG. 2E is a continuation of FIG. 2D.

The mobile data storage 14 can include computer instructions 91 for inserting the at least one location proximate to a transport vehicle on the list of objects to be loaded with associated transport devices and associated transport vehicles based on the request using the libraries in the host data storage.

The mobile data storage 14 can include: computer instructions 93 to receive, verify, and store a member of the group consisting of: a bar code, an RFID tag, an alpha code, a numeric code, an alphanumeric code, and combinations thereof of a transport device; computer instructions 95 to receive, verify, and store a member of the group consisting of: a bar code, an RFID tag, an alpha code, a numeric code, an alphanumeric code, and combinations thereof of a transport vehicle; computer instructions 97 to receive, verify, and store a member of the group consisting of: a bar code, an RFID tag, an alpha code, a numeric code, or combinations thereof on at least one transport device using the input device to verify the transport device as a transport device that should or should not be loaded on one of the transport vehicles; computer instructions 99 to receive, verify, and store a member of the group consisting of: a bar code, an RFID tag, an alpha code, a numeric code, or combinations thereof using the input device to verify that the transport vehicle is a correct transport vehicle for the objects to be loaded; and computer instructions 101 to receive, verify, and store a member of the group consisting of: a bar code, an RFID tag, an alpha code, a numeric code, or combinations thereof to identify a location where the objects or the transport device should be loaded on the transport vehicle.

Figure 2F:
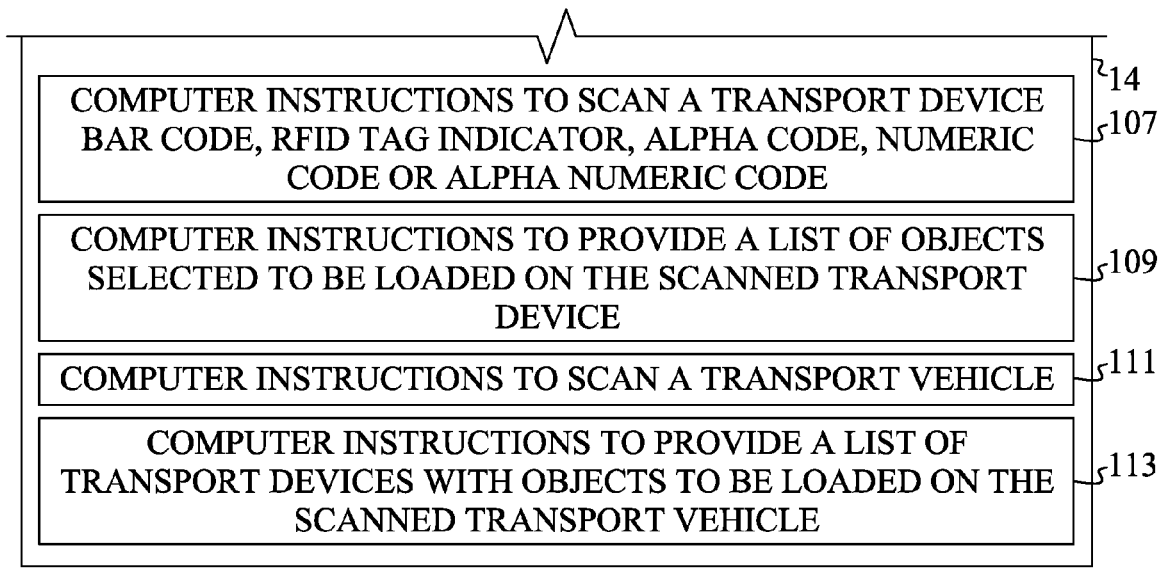
FIG. 2F is a continuation of FIG. 2E.

FIG. 2F is a continuation of FIG. 2E.

The mobile data storage 14 can include: computer instructions 107 to scan a transport device bar code, RFID tag indicator, alpha code, numeric code or alpha numeric code; computer instructions 109 to provide a list of objects selected to be loaded on the scanned transport device; computer instructions 111 to scan a transport vehicle; and computer instructions 113 to provide a list of transport devices with objects to be loaded on the scanned transport vehicle.

Figure 3A:
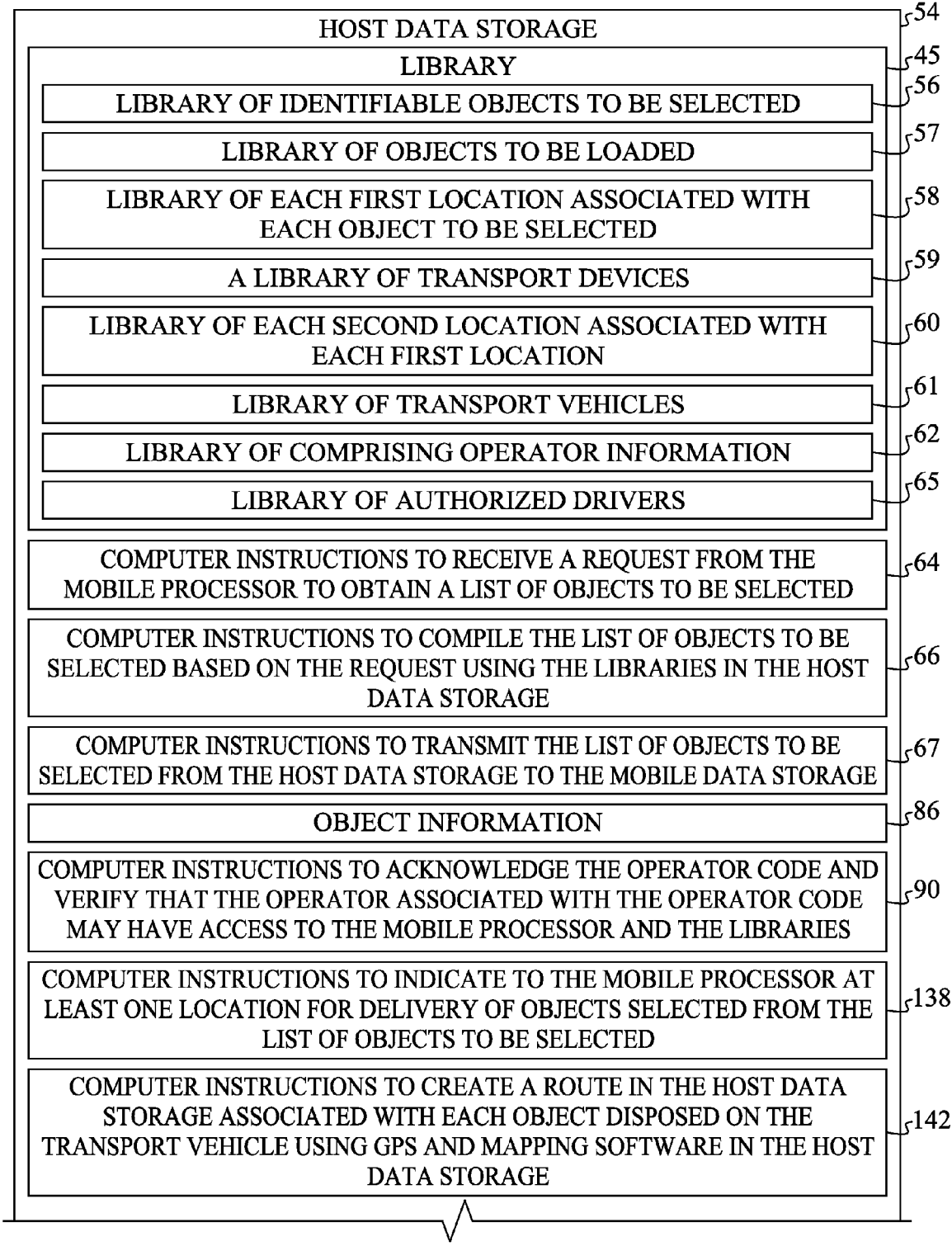
FIG. 3A shows an embodiment of the host data storage with computer instructions.

FIG. 3A shows an embodiment of a host data storage 54 including the library 45.

The library 45 can include: the library of identifiable objects to be selected 56; the library of each first location associated with each object to be selected 58; the library of each second location associated with each first location 60; the library of operator information 62; the library of objects to be loaded 57; the library of transport devices 59; the library of authorized drivers 65; and the library of transport vehicles 61.

The host data storage 54 can include; computer instructions 64 to receive a request from the mobile processor to obtain a list of objects to be selected; computer instructions 66 to compile the list of objects to be selected based on the request using the libraries in the host data storage; computer instructions 67 to transmit the list of objects to be selected from the host data storage to the mobile data storage; object information 86; computer instructions 90 to acknowledge the operator code and verify that the operator associated with the operator code may have access to the mobile processor and the libraries; computer instructions 142 to create a route in the host data storage associated with each object disposed on the transport vehicle using GPS and mapping software in the host data storage; and computer instructions 138 to indicate to the mobile processor at least one location for delivery of objects selected from the list of objects to be selected.

Figure 3B:
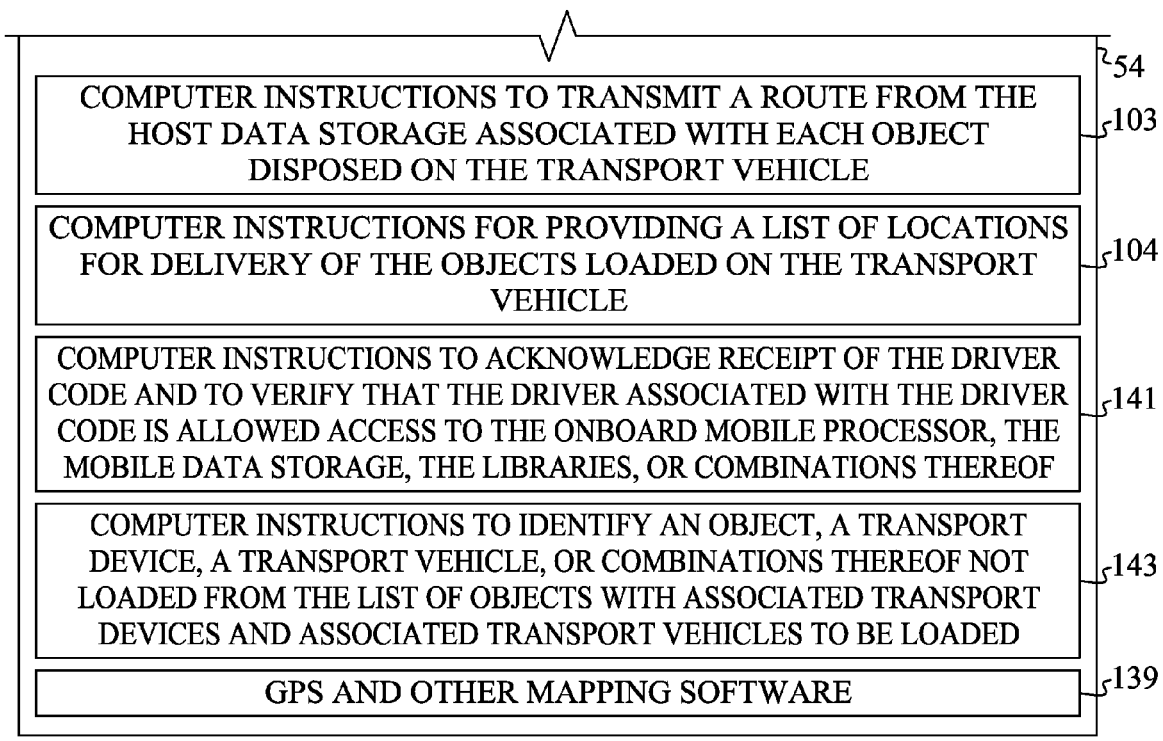
FIG. 3B is a continuation of FIG. 3A.

FIG. 3B is a continuation of FIG. 3A.

The host data storage 54 can include GPS and other mapping software 139.

The host data storage 54 can include computer instructions 141 to acknowledge receipt of the driver code and to verify that the driver associated with the driver code is allowed access to the onboard mobile processor, the mobile data storage, the libraries, or combinations thereof and computer instructions 143 to identify an object, a transport device, a transport vehicle, or combinations thereof not loaded from the list of objects with associated transport devices and associated transport vehicles to be loaded.

The host data storage 54 can include computer instructions 103 to transmit a route from the host data storage associated with each object disposed on the transport vehicle and computer instructions 104 for providing a list of locations for delivery of the objects loaded on the transport vehicle.

FIG. 4 depicts an OLI trigger 74 sending a double click signal 76, a single click signal 78, and a hold signal 80 to the mobile processor 12.

The mobile processor 12 can be in communication with the host server 51 which can in-turn be in communication with an external computer system 55 through the network 50.

A mobile printer 73 can be in communication with the mobile processor 12 for printing reports and lists or other data.

FIG. 5 shows a transport vehicle 118 with a GPS device 144 and a transport onboard processor 150 with an onboard mobile data storage 152 and a transport vehicle display 153.

The transport onboard processor 150 can be in communication with the mobile processor 12 through the network 50.

An operator 17 is shown with an OLI trigger 74 sending a "double click" signal 76 to the mobile processor 12.

Transport device 116 is shown with objects 8*a*, 8*d*, and 8*f* disposed thereon.

Computer instructions 154 are shown in the onboard mobile data storage to receive the route from the host server.

Computer instructions 156 are also shown in the onboard mobile data storage to enable locations associated with each object positioned on the transport device to be identified and placed into the route for delivery on the transport vehicle display.

Figure 6:
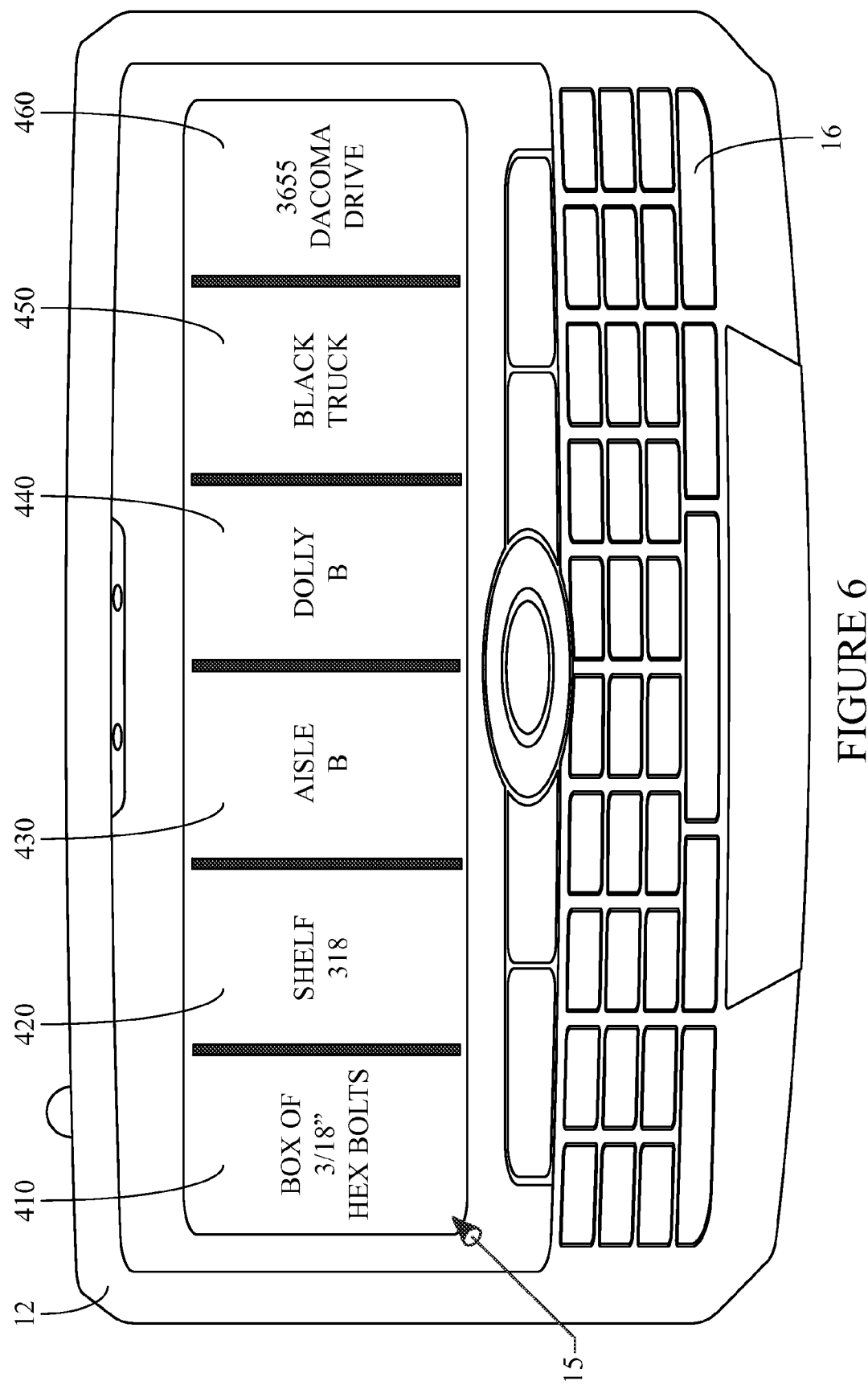
FIG. 6 shows an embodiment of commands on the display of the mobile processor.

FIG. 6 depicts an embodiment of the mobile processor 12 with the input device 16 and the display 15.

The display 15 can present various instructions and information related to an object to be selected, loaded, transported, and delivered.

In the example depicted, which is for illustrative purposes only, the object is a box of 3/16" hex bolts as shown by command 410. The location of the object is Shelf 318 on Aisle B as illustrated by commands 420 and 430. The object is to be loaded onto Dolly B and then on the Black Truck as is illustrated by commands 440 and 450. The object is then to be delivered to 3655 Dacoma Drive as is illustrated by command 460.

Figure 7:
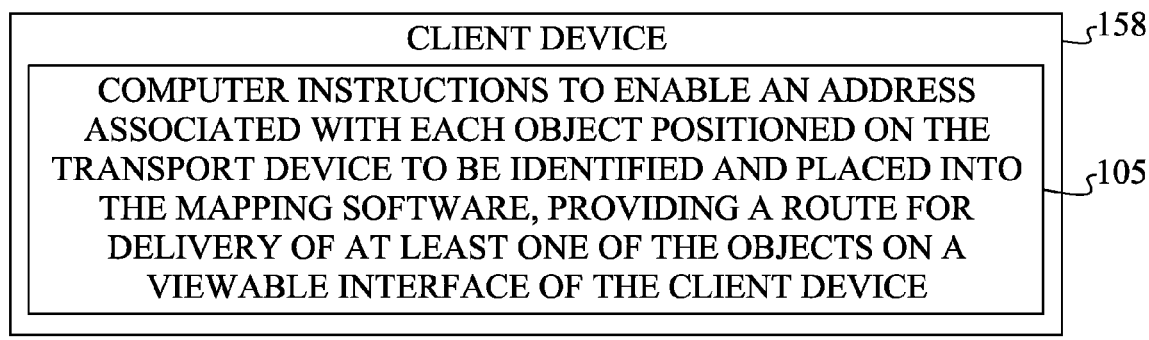
FIG. 7 shows an embodiment of a client device.

FIG. 7 depicts an embodiment of the client device 158 with computer instructions 105 to enable an address associated with each object positioned on the transport device to be identified and placed into the mapping software, providing a route for delivery of at least one of the objects on a viewable interface of the client device.

While these embodiments have been described with emphasis on the embodiments, it should be understood that within the scope of the appended claims, the embodiments might be practiced other than as specifically described herein.

What is claimed is:

1. A system for selecting objects at a location comprising:
   a. a host server comprising a host processor in communication with a host data storage;
   b. at least one mobile processor in communication with a mobile data storage and a display, wherein the at least one mobile processor also communicates with at least one input device, and wherein the mobile data storage comprises:
   (i) computer instructions to receive, verify, and store bar codes on at least one of the objects;
   (ii) computer instructions to receive, verify, and store bar codes related to a first location proximate to at least one of the objects;
   (iii) computer instructions to receive, verify, and store bar codes related to a second location proximate to the first location;
   (iv) computer instructions to receive, verify, and store RFID tag identifiers on at least one of the objects;
   (v) computer instructions to receive, verify, and store an RFID tag related to the first location proximate to at least one of the objects;
   (vi) computer instructions to receive, verify, and store an RFID tag related to the second location proximate to the first location;
   (vii) computer instructions to receive, verify, and store alpha codes, numeric codes, or combinations thereof on at least one of the objects;
   (viii) computer instructions to receive, verify, and store alpha codes, numeric codes, or combinations thereof related to the first location proximate to at least one of the objects;
   (ix) computer instructions to receive, verify, and store alpha codes, numeric codes, or combinations thereof on the second location proximate to the first location;
   (x) computer instructions to provide a first command to an operator identifying at least one of the objects, the first location of at least one of the objects, the second location relative to the first location, or combination thereof;
   (xi) computer instructions to provide a second command to the operator to move to the first location, the second location, or combinations thereof;
   (xii) text-to-speech computer instructions enabling the mobile processor to translate text commands to audio commands for the operator;
   (xiii) computer instructions for receiving a query from the operator;
   (xiv) computer instructions to request the host server in communication with the mobile processor through a network to verify that the mobile data storage has a current version of at least one library selected from the group of libraries consisting of:
   1. a library of identifiable objects to be selected;
   2. a library of each first location associated with each object to be selected;
   3. a library of each second location associated with each first location;
   4. a library comprising operator information;
   5. a library of objects to be loaded;
   6. a library of transport devices;
   7. a library of transport vehicles; and
   8. combinations thereof;

(xv) computer instructions for receiving updated versions of the libraries;
c. computer instructions in the host data storage comprising:
   (i) the library of identifiable objects to be selected;
   (ii) the library of each first location associated with each object to be selected;
   (iii) the library of each second location associated with each first location;
   (iv) the library comprising operator information;
   (v) the library of objects to be loaded;
   (vi) the library of transport devices;
   (vii) the library of transport vehicles;
   (viii) computer instructions to receive a request from the mobile processor to obtain a list of objects to be selected;
   (ix) computer instructions to compile the list of objects to be selected based on the request using the libraries in the host data storage; and
   (x) computer instructions to transmit the list of objects to be selected from the host data storage to the mobile data storage;
d. a first output for engaging an audio output device in communication with the mobile processor, wherein the mobile processor provides a command through the audio output device so the operator can hear;
e. a second output in communication with the display for presenting the list of objects to be selected by the operator, the commands to the operator, or combinations thereof; and
f. an object location identification trigger in communication with the mobile processor, wherein the mobile processor is configured to receive predefined signals associated with predefined responses from the object location identification trigger, wherein the predefined signals are a "double click" signal formed by pressing at least a portion of the object location identification trigger twice, a "single click" signal formed by pressing at least the portion of the object location identification trigger once, and a "hold" signal formed by pressing at least the portion of the object location identification trigger and holding it in a pressed state, and wherein the object location identification trigger responds to one of the commands using:
   (i) the "double click" signal as a response that informs the mobile processor that the operator has completed the command, that the operator has arrived at one of the first locations, that the operator has arrived at one of the second locations, that the operator is ready to accept a new command, that the operator has answered "yes" to a question and that the operator is ready to proceed to a next step or combinations thereof;
   (ii) the "single click" signal as a response that informs the mobile processor to repeat the most recent audio command, question, information or statement; and
   (iii) the "hold" signal as a response that informs the mobile processor that the operator wants to perform the following:
      1. scan or read a bar code, an RFID tag, an alpha code, a numeric code, or combinations thereof on at least one of the objects using the input device;
      2. scan or read a bar code, an RFID tag, an alpha code, a numeric code or combinations thereof at the first location using the input device;
      3. scan or read a bar code, an RFID tag, an alpha code, a numeric code or combinations thereof at the second location using the input device; or
      4. combinations thereof.

2. The system of claim 1, further comprising at least one external computer system in communication with the host processor through the network for transferring information between the mobile processor, the host processor, the at least one external computer system, or combinations thereof.

3. The system of claim 1, wherein the at least one input device is a member of the group consisting of: a keyboard, a touch screen, and combinations thereof.

4. The system of claim 1, wherein the at least one input device is a three dimensional spatial coordinate sensor to allow the operator to communicate object information by using a physical motion of the input device to the mobile processor, wherein the object information comprises a dimension of the object, or a three dimensional spatial coordinate of the object, and wherein the object information further includes at least one of the following:
   a. a yes answer;
   b. a no answer;
   c. a request to repeat a command;
   d. an indication that a task is a completed task;
   e. an indication that the operator is communicating at least one statement that is a member from the group consisting of:
      (i) "cannot find the object";
      (ii) "cannot find the first location";
      (iii) "cannot find the second location"; or
      (iv) combinations thereof; and
   f. an alpha code, a numeric code, or combinations thereof.

5. The system of claim 1, wherein the mobile data storage comprises computer instructions to transmit an operator code entered by the operator into the mobile processor to the host processor, and wherein the host data storage has computer instructions to acknowledge the operator code and verify that the operator associated with the operator code may have access to the mobile processor and the libraries of the mobile processor.

6. The system of claim 1, wherein the objects or location identification trigger comprises:
   a. a button on a wearable scanner, an optical reader, an RFID reader, or a bar code reader;
   b. a trigger on a wearable scanner, an optical reader, an RFID reader, or a bar code reader;
   c. an actuator on a wearable scanner, an optical reader, an RFID reader, or a bar code reader; or
   d. combinations thereof.

7. The system of claim 1, further comprising computer instructions within the mobile data storage for instructing the mobile processor to prepare a summary of objects to be selected and categorized by the second location of each object and with an indication of a quantity of each object at each location.

8. The system of claim 1, further comprising computer instructions in the mobile data storage to obtain, store, and display status information on a successful completion of selection of the objects on the list of objects to be selected that is an indication of the operator's performances compared to an expected completion time for completing selection of the objects on the list of objects to be selected.

9. The system of claim 1, further comprising computer instructions in the mobile data storage for receiving information from the input device that the operator has "picked short" and to transmit a third command to the audio output device, display or combinations thereof, for the operator to indicate a quantity of selected objects that is less than a quantity of objects indicated on the list of objects to be selected.

10. The system of claim 9, further comprising computer instructions in the mobile data storage to allow the operator to enter and store a reason the operator "picked short", a reason the quantity of selected objects is less than the quantity of objects indicated on the list of objects to be selected, or combinations thereof.

11. The system of claim 1, further comprising computer instructions in the mobile data storage for providing an alert to the operator that one of the objects on the list of objects to be selected is a "catch weight item" by using the text-to-speech computer instructions.

12. The system of claim 11, further comprising computer instructions in the mobile data storage for recording the number and weight of the catch weight item by using the input device.

13. The system of claim 7, further comprising computer instructions in the mobile data storage to provide a "high quantity item" alert to the operator by using the output device after the summary of objects to be selected is provided to the operator.

14. The system of claim 1, wherein the method of selecting is a pick by line method of selecting.

15. A system for selecting and loading objects at a location comprising:
- a. a host server comprising a host processor in communication with a host data storage;
- b. at least one mobile processor in communication with a mobile data storage and a display, wherein the mobile processor also communicates with at least one input device, and the mobile data storage comprises computer instructions including:
  - (i) computer instructions to receive, verify, and store bar codes on at least one of the objects;
  - (ii) computer instructions to receive, verify, and store bar codes related to a first location proximate to at least one of the objects;
  - (iii) computer instructions to receive, verify, and store bar codes related to a second location proximate to the first location;
  - (iv) computer instructions to receive, verify, and store an RFID tag on at least one of the objects;
  - (v) computer instructions to receive, verify, and store an RFID tag related to the first location proximate to at least one of the objects;
  - (vi) computer instructions to receive, verify, and store an RFID tag related to the second location proximate to the first location;
  - (vii) computer instructions to receive, verify, and store alpha codes, numeric codes, or combinations thereof on at least one of the objects;
  - (viii) computer instructions to receive, verify, and store alpha codes, numeric codes, or combinations thereof related to the first location proximate to at least one of the objects;
  - (ix) computer instructions to receive, verify, and store alpha codes, numeric codes or combinations thereof on the second location proximate to the first location;
  - (x) computer instructions to provide a first command to an operator identifying at least one of the objects, the first location of at least one of the objects, the second location relative to the first location, or combination thereof;
  - (xi) computer instructions to provide a second command to the operator to move to the first location, the second location, or combinations thereof;
  - (xii) text-to-speech computer instructions enabling the mobile processor to translate text commands to audio commands for the operator;
  - (xiii) computer instructions for receiving a query from the operator;
  - (xiv) computer instructions to request the host server in communication with the mobile processor through a network to verify that the mobile data storage has a current version of at least one library selected from the group of libraries consisting of:
    1. a library of identifiable objects to be selected;
    2. a library of each first location associated with each object to be selected;
    3. a library of each second location associated with each first location;
    4. a library comprising operator information;
    5. a library of objects to be loaded;
    6. a library of transport devices;
    7. a library of transport vehicles; and
    8. combinations thereof; and
  - (xv) computer instructions for receiving updated versions of the libraries;
- c. computer instructions in the host data storage comprising:
  - (i) the library of identifiable objects to be selected;
  - (ii) the library of each first location associated with each object to be selected;
  - (iii) the library of each second location associated with each first location;
  - (iv) the library comprising operator information;
  - (v) the library of objects to be loaded;
  - (vi) the library of transport devices;
  - (vii) the library of transport vehicles;
  - (viii) computer instructions to receive a request from the mobile processor to obtain a list of objects to be selected;
  - (ix) computer instructions to compile the list of objects to be selected based on the request using the libraries in the host data storage; and
  - (x) computer instructions to transmit the list of objects to be selected from the host data storage to the mobile data storage;
- d. a first output for engaging an audio output device for providing commands through the audio output device for the operator to hear, wherein the display presents the list of objects to be selected to the operator, the commands to the operator, or combinations thereof, and wherein the mobile data storage comprises computer instructions for providing results to the output;
- e. a second output for engaging a display;
- f. an object location identification trigger in communication with the mobile processor, wherein the mobile processor is configured to receive predefined signals associated with predefined responses from the object location identification trigger, wherein the predefined signals are a "double click" signal formed by pressing at least a portion of the object location identification trigger twice, a "single click" signal formed by pressing at least the portion of the object location identification trigger once, and a "hold" signal formed by pressing at least the portion of the object location identification trigger and holding it in a pressed state, and wherein the object location on identification trigger responds to one of the commands using:
  - (i) the "double click" signal as a response that informs the mobile processor that the operator has completed the command, that the operator has arrived at one of the first locations, that the operator has arrived at one of the second locations, that the operator is ready to accept a new command, that the operator has answered "yes" to a question and that the operator is ready to proceed to a next step or combinations thereof;

(ii) the "single click" signal as a response that informs the mobile processor to repeat the most recent audio command, question, information or statement; and (iii) the "hold" signal as a response that informs the mobile processor that the operator wants to perform the following:
1. scan or read a bar code, an RFID tag, an alpha code, a numeric code, or combinations thereof on at least one of the objects using the input device;
2. scan or read a bar code, an RFID tag, an alpha code, a numeric code or combinations thereof at the first location using the input device;
3. scan or read a bar code, an RFID tag, an alpha code, a numeric code or combinations thereof at the second location using the input device; or
4. combinations thereof; and g. at least one transport device, wherein each object to be selected is disposed on a transport device, and wherein a transport vehicle is used to move each transport device.

16. The system of claim 14, further comprising computer instructions in the mobile data storage to request the operator to answer a series of safety questions regarding the transport vehicle, which include at least one question selected from the group comprising:
a. "Are brakes on the transport vehicle working?";
b. "Is a horn on the transport vehicle working?";
c. "Is steering on the transport vehicle working?";
d. "Is the transport vehicle damage free?";
e. "Is the transport vehicle leak free?";
f. "Are tires on the transport vehicle inflated and undamaged?"; and
g. "Are forks on the transport vehicle undamaged?".

17. The system of claim 14, further comprising computer instructions in the mobile data storage for instructing the mobile processor to alert the operator to position each object at a specific location on the transport device.

18. The system of claim 16, further comprising computer instructions in the host data storage to indicate to the mobile processor at least one location for delivery of objects selected from the list of objects to be selected.

19. The system of claim 17, wherein the at least one location is a loading location, a staging location, an interim location, a back of a truck, a trailer, or a vessel.

20. The system of claim 14, further comprising computer instructions in the mobile data storage for indicating the transport device to the operator for positioning at least one of the objects.

21. The system of claim 19, wherein the transport device is a cooler, a pallet, a tote, a box, a sack, a bag, a wheeled trolley, a container, or combinations thereof.

22. A system for selecting and loading objects and delivering objects at a location comprising:
a. a host server comprising a host processor in communication with a host data storage;
b. at least one mobile processor in communication with a mobile data storage, a display, and an audio output device, wherein the mobile processor also communicates with at least one input device, and the mobile data storage comprises:
(i) computer instructions to receive, verify, and store bar codes on at least one of the objects; to receive, verify, and store bar codes related to a first location proximate to at least one of the objects; to receive, verify, and store bar codes related to a second location proximate to the first location; to receive, verify, and store RFID tag identifiers on at least one of the objects; to receive, verify, and store an RFID tag related to the first location proximate to at least one of the objects; to receive, verify, and store an RFID tag related to the second location proximate to the first location; to receive, verify, and store alpha codes, numeric codes, or combinations thereof on at least one of the objects; to receive, verify, and store alpha codes, numeric codes, or combinations thereof related to the first location proximate to at least one of the objects; to receive, verify, and store alpha codes, numeric codes or combinations thereof on the second location proximate to the first location;
(ii) computer instructions to provide a first command to an operator identifying at least one of the objects, the first location of at least one of the objects, the second location relative to the first location, or combination thereof;
(iii) computer instructions to provide a second command to the operator to move to the first location, the second location, or combinations thereof;
(iv) computer instructions to scan a transport device bar code, RFID tag indicator, alpha code, numeric code or alpha numeric code;
(v) text-to-speech computer instructions enabling the mobile processor to translate text commands to audio commands for the operator;
(vi) computer instructions to provide a list of objects selected to be loaded on the scanned transport device;
(vii) computer instructions for receiving a query from the operator;
(viii) computer instructions to scan a transport vehicle;
(ix) computer instructions to provide a list of transport devices with objects to be loaded on the scanned transport vehicle;
(x) computer instructions to request the host server in communication with the mobile processor through a network to verify that the mobile data storage has a current version of at least one library selected from the group of libraries consisting of:
1. a library of identifiable objects to be selected;
2. a library of the first locations associated with each object to be selected;
3. a library of at least one second location associated with each of the first locations;
4. a library of authorized operators of the libraries comprising operator information;
5. a library of objects to be loaded;
6. a library of transport devices;
7. a library of transport vehicles; and
8. combinations thereof;
(xi) computer instructions for receiving updated versions of the libraries;
c. computer instructions in the host data storage comprising:
(i) the library of identifiable objects to be selected;
(ii) the library of the first locations associated with each object to be selected;
(iii) the library of at least one second location associated with each of the first locations;
(iv) the library of authorized operators of the libraries comprising operator information;
(v) the library of objects to be loaded;

(vi) the library of transport devices;
(vii) the library of transport vehicles;
(viii) computer instructions to receive a request from the mobile processor to obtain a list of objects to be selected;
(ix) computer instructions to compile the list of objects to be selected based on the request using the libraries in the host data storage;
(x) computer instructions to transmit the list of objects to be selected from the host data storage to the mobile data storage; and
(xi) computer instructions for providing a list of locations for delivery of the objects loaded on the transport vehicle;

d. a first output engaging an audio output device in communication with the mobile processor for providing commands through the audio output device for the operator to hear, e. a second output engaging the display to presents the list of objects to be selected to the operator, the commands to the operator, or combinations thereof, f. an object location identification trigger in communication with the mobile processor, wherein the mobile processor is configured to receive predefined signals associated with predefined responses from the object location identification trigger, wherein the predefined signals are a "double click" signal formed by pressing at least a portion of the object location identification trigger twice, a "single click" signal formed by pressing at least the portion of the object location identification trigger once, and a "hold" signal formed by pressing at least the portion of the object location identification trigger and holding it in a pressed state, and wherein the object location identification trigger responds to one of the commands using:

(i) the "double click" signal as a response that informs the mobile processor that the operator has completed the command, that the operator has arrived at one of the first locations, that the operator has arrived at one of the second locations, that the operator is ready to accept a new command, that the operator has answered "yes" to a question and that the operator is ready to proceed to a next step or combinations thereof;

(ii) "single click" signal as a response that informs the mobile processor to repeat the most recent audio command, question, information or statement; and (iii) the "hold" signal as a response that informs the mobile processor that the operator wants to perform the following:
1. scan or read a bar code, an RFID tag, an alpha code, a numeric code, or combinations thereof on at least one of the objects using the input device;
2. scan or read a bar code, an RFID tag, an alpha code, a numeric code or combinations thereof at the first location using the input device;
3. scan or read a bar code, an RFID tag, an alpha code, a numeric code or combinations thereof at the second location using the input device; or
4. combinations thereof;

g. at least one transport device, wherein each object to be selected is disposed on a transport device, and wherein a transport vehicle is used to move each transport device;

h. an onboard processor in communication with the mobile processor, the host processor, or combinations thereof through the network for use with delivery of the objects to customers, wherein the onboard processor communicates with an onboard mobile data storage and a transport vehicle display;

i. computer instructions to transmit a route from the host data storage associated with each object disposed on the transport vehicle;

j. computer instructions in the onboard mobile data storage to receive the route from the host server; and k. computer instructions in the onboard mobile data storage to enable an address associated with each object positioned on the transport device to be identified for delivery of at least one of the objects on the transport vehicle display.

23. The system of claim 22, further comprising a client device in communication with the mobile processor, host processor, transport onboard processor, or combinations thereof through the network, wherein the client device comprises computer instructions to enable an address associated with each object positioned on the transport device to be identified and placed into the mapping software, providing a route for delivery of at least one of the objects on a viewable interface of the client device.

\* \* \* \* \*